March 11, 1941.	H. C. WELLMAN	2,234,714
FILM GATE STRUCTURE
Filed Jan. 20, 1939
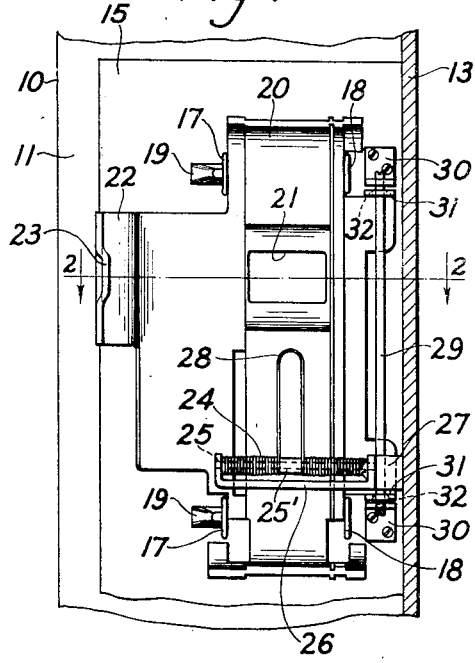
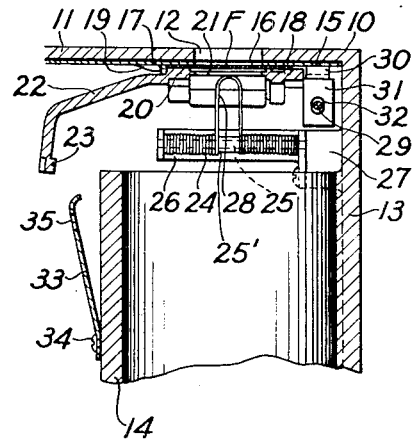
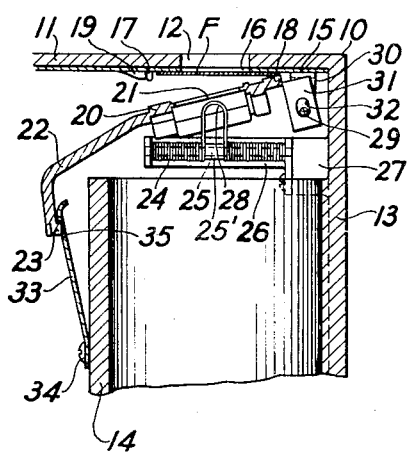
Howard C. Wellman
INVENTOR
BY
ATTORNEYS Patented Mar. 11, 1941

2,234,714

UNITED STATES PATENT OFFICE 2,234,714

FILM GATE STRUCTURE

Howard C. Wellman, Rochester, N. Y., assignor to Eastman Kodak Company, Rochester, N. Y., a corporation of New Jersey Application January 20, 1939, Serial No. 251,994

3 Claims. (Cl. 88—17)

The present invention relates to a film gate structure and more particularly to features of film gate construction which facilitate edgewise threading of a film and which improve the operating characteristics of the film gate.

The primary object of the invention is the provision of a hinge mounting for the movable member of the film gate assembly, such hinge connection permitting both a swinging movement of the movable gate member and a rectilinear movement thereof with respect to the film strip and the other gate member.

Another object of the invention is the provision of a catch means for fastening said movable gate member in open position during threading of the gate.

A further object of the invention is the provision of inclined portions on the threading side of the film gate for guiding the leading edge of the film over edge guiding members which engage the edges of the film strip.

Other and further objects of the invention will be suggested to those skilled in the art by the following disclosure.

The aforementioned and other objects of the invention are realized in a film gate assembly including a stationary gate member, a movable gate member, a resilient means for urging said gate members toward each other, and a loose hinge connection between said gate members, having a hinge axis parallel to the longitudinal edge of the film strip in the gate, and supporting the movable gate member for movement transversely of the hinge axis and for rotation about said hinge axis upon opening of the moveable gate member during rotating. Said movable gate member may carry an extension arm for engaging a catch member on the frame or objective sleeve of the apparatus when said gate member is moved to open position. Finally, inclined portions are provided on the stationary gate member to conduct the leading edge of the film during threading over edge guides for the film.

Reference is hereby made to the accompanying drawing wherein similar reference characters designate similar elements and wherein:

Fig. 1 is a front elevation of the film gate assembly according to the invention and showing the movable gate member in closed position.

Fig. 2 is a cross section taken on the line 2—2 of Fig. 1.

Fig. 3 is a cross section similar to that shown in Fig. 2 but with the movable gate member shown in open position.

In the illustrated embodiment of the invention, the film gate assembly is shown mounted upon a frame member 10 which includes a wall 11 provided with an aperture 12 and a wall 13 carrying an objective sleeve 14.

The stationary gate member comprises a plate 15 which is provided with an aperture 16 and carries two pairs of edge guiding members 17 and 18. The apertured plate 15 may be deformed or embossed in a known manner to provide a film guideway engaging only marginal portions of the film strip F. Also one of each pair of edge guiding members 17 and 18 may be mounted resiliently to press against one edge of the film strip F in a well recognized manner.

It will be readily understood that in a film gate of the type shown and during edgewise threading of the film strip there may be some interference by reason of the leading edge of the film being threaded striking against the nearer film edge guide 17. Consequently, according to the invention, inclined portions are provided on or in the plate 15 to conduct the leading edge of the film over said edge guiding member 17. Such inclined portions 19 are adjacent the edge guiding member on the side of the film strip which is opposite the hinge connection between the gate members and is also outside of or beyond the film guideway so as to be engaged by the film only during threading. Inclined portions 19, see Figs. 2 and 3, are inclined away from the gate plate 15 and toward the outermost edge of the adjacent edge guiding member 17. These inclined portions 19 may be securely fastened to the plate 15 or may be embossed from the stock or material constituting said plate 15.

The movable gate member 20 is also formed or deformed in a known manner to engage only marginal portions of the film strip F, and is provided with an opening 21 which registers with the apertures 16 and 12, respectively, in plate 15 and wall 11 when the movable gate member 20 is in its closed operative position. Said movable gate member includes or carries an extension arm 22 which has an inclined portion for guiding the film toward the gate members and a portion bent forwardly or toward the objective sleeve 14 and carrying a projection 23.

The movable gate member 20 is resiliently urged toward the stationary gate member or plate 15 by a resilient means which may be of conventional design. Such a resilient means is shown herein and comprises a coiled spring 24 encircling a post 25 which is carried by a bracket 26 upon a boss 27 of wall 13. Said coil spring 24 is divided into two sections by a spacing sleeve 25' and has a central extension 23 bearing upon the rear surface of movable gate member 20 and which normally tends to move said gate member 20 to its closed position.

A loose hinge connection is provided between the two gate members and comprises a hinge pin mounted on one of the gate members and a pair of hinge lugs mounted in spaced relation on the other gate member. The hinge pin 29 is mounted in a pair of brackets 30 which are attached to said plate 15. The hinge lugs 31 are integral with or attached to the movable gate member 20, are located or bent into a plane perpendicular to the hinge axis and film plane, and are each provided with an elongated slot 32 which has its major axis substantially perpendicular to the film plane when movable gate member 20 is in closed position. It will be understood that the location of the hinge pin 29 and hinged lugs 31 may be reversed without departing from the scope of the invention.

A catch means is provided upon the objective sleeve of the frame member and may comprise a spring catch member 33 fastened to objective sleeve 14 by a screw 34, being bent normally to extend away from the objective sleeve 14, and being provided near its outer end with a slot 35. The function of this catch means is to engage the movable gate member and hold it in open position. Specifically the projection 23 on extension arm 22 of the movable gate member 20 engages the slot 35 in the end of spring catch member 33.

Although side hinge connections for film gates are known, and although such connections have been arranged to permit rectilinear movement of the movable film gate, these objects have never before been accomplished with a construction which is as rugged and simple as the construction shown herein. The loose hinge connection between the gate members not only permits the movable gate member to be swung open for threading but also permits the movable gate member 20 to move in parallel relation with respect to the stationary gate member upon variation in thickness of the film strip passing between the gate members. It should also be noted that by reason of the construction shown the resilient means not only urges the movable gate member toward the stationary gate member to support a film therebetween but also returns the movable gate member from the open position of Fig. 3. Since many variations of this invention will occur readily to those skilled in the art, the present disclosure is to be viewed in an illustrative sense and the scope of the invention is to be determined by the claims which follow.

Having now particularly described my invention what I desire to secure by Letters Patent of the United States and what I claim is:

1. A film handling apparatus comprising a frame member including an objective sleeve, a stationary gate member, a movable gate member, a hinge connection between said gate members and for supporting said movable gate adjacent said objective sleeve, a resilient means for urging said gate members toward each other, a spring catch member mounted on said objective sleeve, and an extension arm on said movable gate member having an inclined portion for guiding film toward said gate members and a portion bent toward said objective sleeve and carrying a projection for engaging said catch member when said gate member is moved to open position.

2. A film handling apparatus, comprising an elongated stationary gate member and an elongated movable gate member each having a film guideway for a film strip, a resilient means for urging said movable gate member toward said stationary gate member, and a loose hinge connection between said gate members and including a hinge pin mounted on one of said gate members in parallel relation to the longitudinal edge of said film strip, and a pair of hinge lugs mounted in spaced relation on the other gate member and each provided with an opening which encircles said hinge pin and which is elongated perpendicularly of the plane of the film guiding surface of said other gate member.

3. A film handling apparatus, comprising an elongated stationary gate member and an elongated movable gate member both arranged to form a guideway for a film strip which extends lengthwise therebetween, a resilient means for urging said movable gate member toward said stationary gate member, and a loose hinge connection between said gate members, including hinge brackets on one of said gate members, a hinge pin mounted in said brackets parallel to the longitudinal edge of said film strip, and hinge lugs on the other gate member provided with elongated openings and engaging said hinge pin and brackets to support said movable gate member for movement transversely of said hinge axis by variations in thickness of said film strip and for rotation about said hinge axis for opening of said movable gate member during threading.

HOWARD C. WELLMAN.